B. Gardner,
Millstone Pick.
Nº 873. Patented Aug 3, 1838.
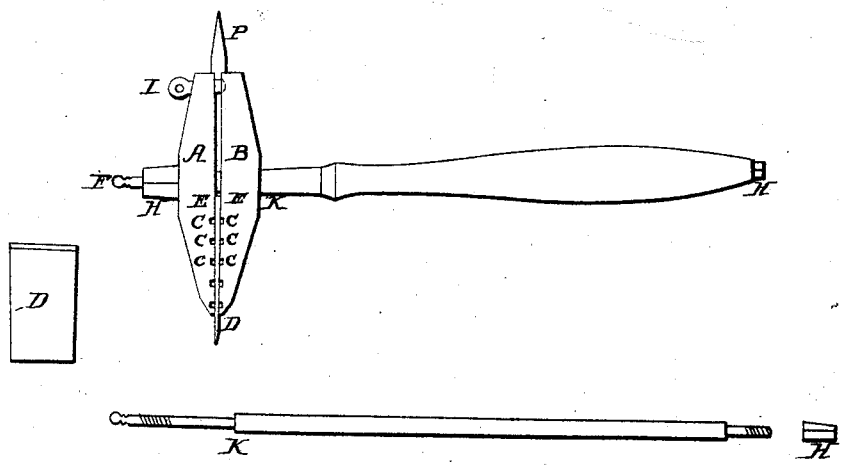

UNITED STATES PATENT OFFICE.

BELA GARDNER, OF ASHFIELD, MASSACHUSETTS.

PECK-HAMMER FOR PECKING OR WORKING MILL AND OTHER STONES.

Specification of Letters Patent No. 873, dated August 3, 1838.

*To all whom it may concern:*

Be it known that I, BELA GARDNER, of Ashfield, in the county of Franklin and State of Massachusetts, have invented a new and useful Peck-Hammer for Pecking or Working Mill and other Stones; and I do hereby declare that the following is a full and exact description.

First, construct two plates of iron or steel A, B of the same dimensions, in form of a half peck hammer, with a plane surface on one side, which when placed together will represent the hammer in a solid form. The sides on which the plates meet should be perfectly plane and smooth. Or to give an idea of said plates in another way, suppose you make a peck hammer in the usual form, solid, and then divide it through the center at right angles with the handle, from edge to edge, and let the division be made from right to left. The two pieces would then represent the plates aforesaid. There is to be a hole through the center of the plates for the handle to be inserted. And there are also to be six or more, or less, grooves C cut horizontally across the plane surfaces of the plates opposite to each other, for the shoulders of the chisel, or edge, to rest in. The chisel or edge D is a thin piece of steel made of the same width, as the plates with the upper end turned each way, forming the shoulders E aforesaid, which are to set into the grooves aforesaid, and it is to be placed between said plates, and held firm there, by means of an iron rod F which passes through the whole length of the handle and the head of the hammer, with a screw and nut H at each end; so that by turning the nut H at the head of the hammer, it brings the T plates together, and presses upon the edge, and holds it firm between the plates—and the shoulders resting the grooves, prevents the edge from moving up or down. There is also to be another hole through one plate and into the other above the handle, into which a head screw I is to be inserted perpendicular or at right angles to the plates to assist further in bringing the plates together and regulating them so as to hold the edge firm. The chisel or edge aforesaid, is to be made of steel hardened & tempered for use, and when it becomes dull or battered—it is to be taken out and ground off, and is then fit for use again. As it is shortened by using, it can be moved up in the grooves aforesaid.

The edge aforesaid never requires heating and hammering to prepare it for use, as that is done by grinding—and herein is the chief excellency of the said hammer, because you avoid the expense of sharpening the edge by heat and hammering in the old way—and the expense of new laying &c. The plates aforesaid will answer for ever-so-many edges. There is to be a shoulder K on the rod, at the end of the handle next to the hammer, to resist the draft of the nut on the opposite side, so as to hold the edge firm. At each end of the handle there should be a ferrule to give strength and solidity. Between the opposite ends of the plates from where the cutting tool is placed there is secured a sharp cylindrical picking tool P held firmly by the screw I and nut H—cavities being made in the plates to receive it.

If it is desired to use the edge of the hammer in a direct line, in the manner that the edge of an ax is used, the handle can be inserted through a diamond eye, cut through the plates in the direction of the edge and fastened by a nut and screw as aforesaid, the plates being held together by a bolt, as by the handle first mentioned. If it is desired to apply the principle herein set forth to the uses of a chisel, it may be done, using the same fastening & extending one of said plates so as to form the handle, with a shoulder in it for the end of the other plate to rest on.

What I claim as my invention, and desire to secure by Letters Patent is as follows:

I do not claim to be the inventor of a peck hammer having a removable chisel secured between two cheeks; but What I do claim as my invention, is—

1. The addition of the shoulders or projections on the upper end of the chisel plate fitting into the channels in the face of the cheeks in manner and for the purpose herein described; and 2. I also claim in combination the mode of fastening the cheeks together in manner substantially as herein described.

BELA GARDNER.

Witnesses:
ALMON BRAINARD,
JAMES T. GUNNELL.